July 30, 1963   L. C. HOLMES   3,099,400
DUAL HEADLIGHTS FOR MOTORCYCLES
Filed Feb. 19, 1962

LUCAS C. HOLMES
INVENTOR.

BY

ATTORNEY

United States Patent Office 3,099,400
Patented July 30, 1963

3,099,400
DUAL HEADLIGHTS FOR MOTORCYCLES
Lucas C. Holmes, 324½ W. 76th St.,
Los Angeles 3, Calif.
Filed Feb. 19, 1962, Ser. No. 174,135
2 Claims. (Cl. 240—7.55)

This invention relates generally to headlights for motorcycles, and more particularly to an assembly for mounting two incandescent lamps side by side in the front of a motorcycle.

It is an object of this invention to provide a headlight assembly of the above-mentioned character permitting use of one or two lights, as desired, to light the motorcycle driver's way. Preferably, the lamps employed are of conventional high-low beam type whereby either or both may be turned to high or low beam settings as desired.

Another object is to provide a dual headlight assembly for motorcycles which is adapted to be easily and readily mounted on the front fork of any sundry of the current and older models of motorcycles.

Still another object is to provide a dual headlight assembly for motorcycles adapted to accommodate conventional lamps and lamp mountings as are currently being used on automobiles.

A further object is to provide brackets, as an accessory, for mounting spot lights at the sides of the dual headlights.

A general object of this invention is to provide a dual headlight assembly for detachable mounting on a motorcycle, and which is simple and rugged in construction, easy to mount, reliable in operation, and economical to manufacture.

Further objects and advantages of the invention will appear in the following part of this specification wherein the details of construction and mode of assembly of a preferred embodiment are described with reference to the accompanying drawing, in which:

FIGURE 1 is a perspective view of the front half of a motorcycle outlined in dot and dash lines, and having a headlight assembly of this invention mounted thereon and shown in full lines;

FIGURE 2 is a vertical section through the headlight assembly and pertinent parts of the motorcycle taken on a larger scale and along line 2—2 on FIGURE 1;

FIGURE 3 is a top plan view of the headlight assembly in mounted position and being cut away along line 3—3 of FIGURE 2, the view being taken in the direction of the arrows on the line 3—3; and, FIGURE 4 is a vertical section taken upon a plane indicated by line 4—4 on FIGURE 3.

Referring to the drawing in greater detail and with the use of reference numerals, a headlight assembly of this invention is designated generally by reference numeral 10 and is shown mounted upon a conventional motorcycle 11. The front fork of the motorcycle is designated by numeral 13, it comprising two spring posts 14 and 15 for mounting a front wheel 16 between them, and a yoke portion of the front fork comprising upper and lower yoke members 18 and 19. The upper end portions of the posts 14 and 15 extend through and are suitably secured to each of the yoke members for unitizing the fork. Two smaller posts 21 and 22 extend upwardly from the upper yoke member 18 to support handle-bars 23 atop the front fork.

The dual headlight assembly 10 of this invention comprises two complementary shell halves 26 and 27 adapted to be joined together in embracing relationship around the yoke members 18 and 19. The place of interconnection of the shell halves in the illustrated embodiment is a lap joint 28 which extends medially of the top of the shell and includes suitable fasteners, e.g. screws 29, for securing the overlapping portions in the joint. The overlapping marginal portions of the shell halves at the underside of the assembled shell is represented at 30.

The assembled shell 26, 27 has a recess 32 for accommodating the handle-bar mounting posts 21 and 22. There are two crescent-shaped knock-out portions 33 at the ends of the recess 32 which may be removed for the purposes of lengthening the recess if necessary for use on a model of a motorcycle having its posts 21 and 22 wider apart than in the illustrated model.

At its front, the assembled shell 26, 27 has an inwardly directed circumferential flange or margin 36 defining a front opening 37 of the shell for receiving two incandescent lamps 38 and 39 arranged in juxtaposition. The lamps are of conventional construction and preferably are of the high and low beam type, whereby both may be turned on and switched to high or low beam settings as desired. The lamps are mounted in a main frame or backing member 41, the illustrated embodiment having a backing member of stepped configuration and being one of a standard type used in a current model of an automobile. The backing member 41 has an outside circumferentially continuous flange 43 for securement of the backing member within the shell with a circumferentially arranged series of screws 44 which fasten the flange 43 of the backing member upon the flange 36 of the shell.

Each lamp has a circumferential band 46 with a plurality of tabs 48 for securing the lamps in the backing member with screws 50 extending through the tabs and into aligned tapped holes in the flange 43 of main frame 41. A cable 52 extends through the rear of the backing member 41 for electrical connection to the battery (not shown) of the motorcycle and suitable connection with conventional controls (not shown) for turning the lamps on and off for switching between high and low beam settings.

A trim plate 54 having two openings 55 and 56 for accommodating the lamps 38 and 39 respectively is attached to the flange 43 by a plurality of screws 57 which engage in suitable nut extensions 58 on the front side of the flange 43.

The shell halves are secured as with bolts 60 to the front posts 14 and 15. The bolts 60 also serve to attach brackets 62 and 63 to the sides of the shell for mounting conventional spotlights 64. The illustrated brackets 62 and 63 may be positioned as shown in the drawing or turned upside down, if desired, to mount the spotlights at a level above the level of the headlights 38, 39. Also, the brackets may include extension 67 for mounting additional accessories.

While the particular dual headlights for motorcycles herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A dual headlight assembly for a motorcycle, comprising a horizontally elongated main frame adapted to be supported with its longer dimension extending transversely across the front end of a motorcycle forwardly of the steering column thereof, a pair of sealed beam type lamps mounted in side-by-side relation at the opposite end portions of said main frame, means for detachably securing said lamps in place in said main frame, a combined housing and mounting bracket for said main frame comprising a pair of generally similar shell members adapted to be assembled toward one another over the opposite lateral ends of said main frame and being notched horizontally from their adjacent edges to receive and fit about the legs of the front fork of a motorcycle and arranged to support said main frame and head lamps immediately forwardly of the legs of said fork, the adjacent edges of said shells overlapping one another in the assembled position thereof, means for securing said shells rigidly to a motorcycle front wheel fork, means for securing the overlapping edges of said shells to one another, other means for securing the opposite ends of said main frame for said lamps to adjacent portions of said housing shells, a unitary trim and appearance frame having openings to expose the front face only of said lamps and closely embracing the rims of said lamps with its rear edges positioned to bear against the forward edges of said housing shells, and means for detachably securing said trim and appearance frame to said housing shells and to the main frame for said two lamps.

2. A dual headlight assembly as defined in claim 1 characterized in that the major portion of said pair of housing shells is located forwardly of the two legs of a motorcycle front wheel fork, the forwardly facing portion of said housing shells being open and formed with mounting flange means having parallel faces adapted to abut and seat the rim edges of the main frame for said two lamps and to receive said other securing means for said main lamp frame.

References Cited in the file of this patent

UNITED STATES PATENTS

| | | |
|---|---|---|
| 1,450,324 | McKenzie et al. | Apr. 3, 1923 |
| 2,134,551 | Enfield | Oct. 25, 1938 |
| 2,138,076 | Taylor et al. | Nov. 29, 1938 |
| 2,168,939 | Kraeft | Aug. 8, 1939 |
| 2,323,900 | Dempsey | July 13, 1943 |
| 2,910,575 | Meschwitzer et al. | Oct. 27, 1959 |

FOREIGN PATENTS

| | | |
|---|---|---|
| 510,323 | Belgium | Apr. 15, 1952 |
| 823,617 | Great Britain | Nov. 18, 1959 |